March 9, 1965 J. T. MORRISON 3,172,310
DEBURRING TOOL
Filed March 16, 1962
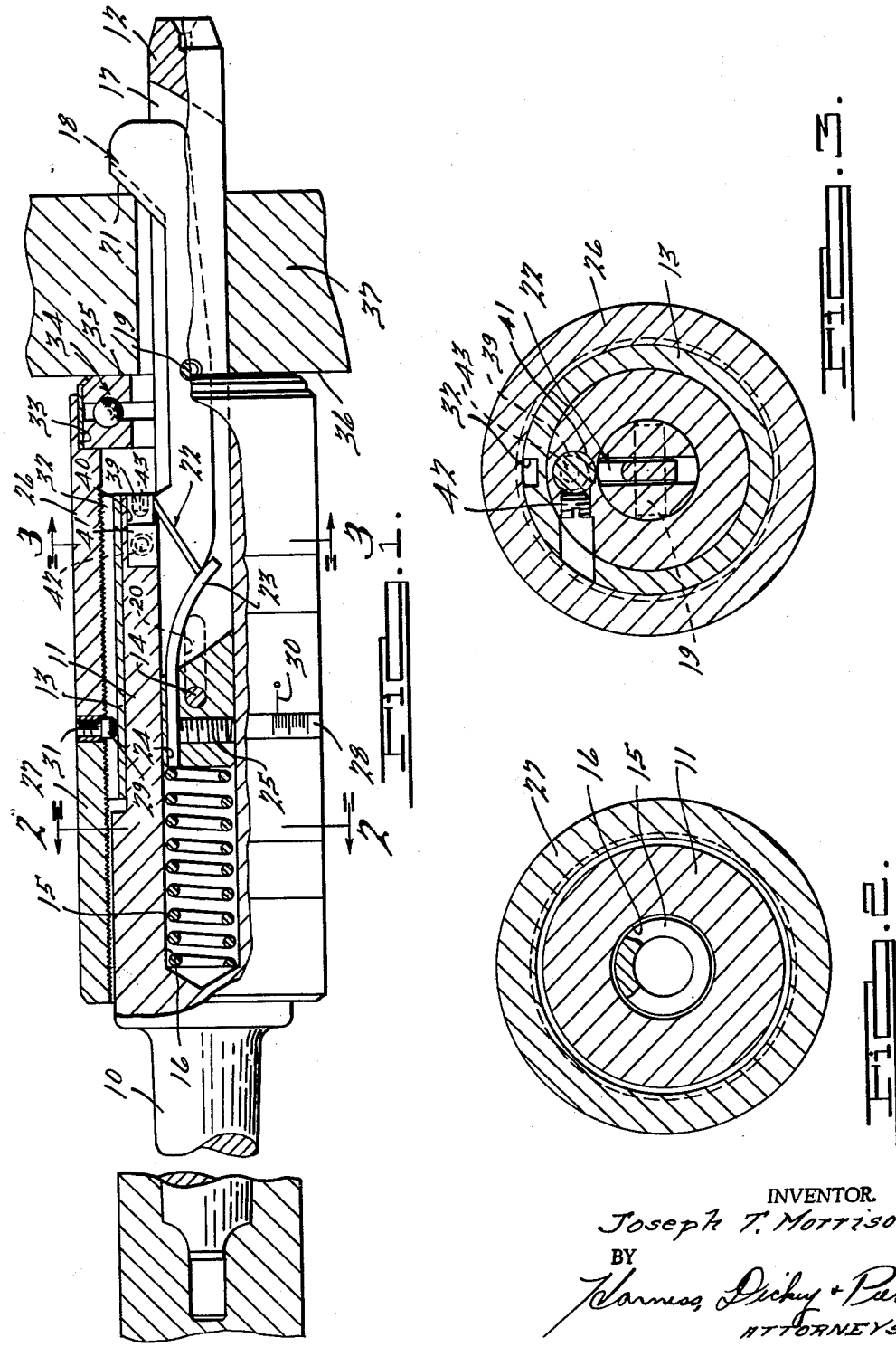
INVENTOR.
Joseph T. Morrison
BY
ATTORNEYS.

3,172,310
DEBURRING TOOL
Joseph T. Morrison, St. Clair Shores, Mich., assignor to Cogsdill Tool Products, Inc., Oak Park, Mich., a corporation of Michigan
Filed Mar. 16, 1962, Ser. No. 180,196
8 Claims. (Cl. 77—73.5)

This invention relates to deburring tools and particularly to a deburring tool having a positive feed to the blade thereof.

The tool of the present invention has a driving head with the central aperture containing a spring and a blade body which is supported on a pin which extends through a slot in the body of the head and into an aperture in a sleeve disposed thereon. The sleeve is preferably made of brass or bronze and is provided with a longitudinal slot on its outer surface in which the head on the inside side of a ring extends for sliding therein. The ring is positioned on the body by a pair of internally threaded sleeves which are screwed onto a thread on the outer surface of the slotted sleeve to lock the ring thereon in fixed adjusted position therebetween. The lower threaded sleeve is provided with a bearing which abuts the surface of the workpiece when the cutter blade and body have been inserted into an aperture therein having an edge which is to be deburred or otherwise machined. A spring within the slot of the blade body urges the inner end of the blade outwardly of the body to retract the cutting edge of the blade thereinto. The forward end of the driving body has a rotatable cam element in the end over which the sloping surface of the rear end of the blade passes as the body of the tool moves along the blade after the forward bearing engages the surface of the workpiece. A spring urges the inner end of the blade outwardly of the center and the outer end of the blade inwardly as the body is retracted. The cutting edge of the blade is cammed outwardly into cutting position by the advancement of the tool body which is permitted to override the cam end of the blade when the cutting edge is in its outermost position. The cam engaging element has an offset cylindrical head which may be rotated to adjust the cam surface inwardly and outwardly to thereby control the distance the cutting edge is advanced outwardly of the body when the cam end of the blade passes thereover. A setscrew clamps the cylindrical head within its aperture when the cam portion is adjusted to a desired position. The degree of advancement of the cutting edge is also controlled by the position of a pair of threaded outer sleeves on the inner sleeve, the amount being indicated by a ring clamped therebetween. The ring is held against rotation by a pin thereof operating in an axially disposed slot as the sleeves are rotated each side thereof. Indices are provided on the ring and on one of the sleeves by which the amount of adjustment is indicated.

Accordingly, the main objects of the invention are: to provide a deburring tool with a blade which is moved outwardly to cutting position by the advancing driving head as it moves over this blade supporting body; to provide an eccentric cam adjustably mounted in rotation in the forward end of the driving head of the tool over which the sloping inner end of the blade rides; to provide a pair of threaded sleeves on each side of a ring for adjusting the position of the work-engaging end of the body, and, in general, to provide a deburring tool which is simple in construction, positive in operation, and economical of manufacture.

Other objects and features of novelty of the invention will be specifically pointed out or will become apparent when referring, for a better understanding of the invention, to the following description taken in conjunction with the accompanying drawings wherein:

FIGURE 1 is a broken, sectional view of a tool with its blade in advanced cutting position embodying features of the present invention;

FIG. 2 is an enlarged, sectional view of the structure illustrated in FIG. 1, taken on the line 2—2 thereof; and FIG. 3 is a sectional view of the structure illustrated in FIG. 1, taken on the line 3—3 thereof.

Referring to the figures, a shank 10 of a driving head 11 is connected to a cylindrical blade body 12 and a sleeve 13 by a pin 14 which extends through an aperture in the sleeve 13 and blade body 12 and through a slot 20 in the driving head body 11.

This permits the driving head 11 to be advanced relative to the blade body 12 and the sleeve 13 and to be moved to retracted position when the blade body 12 is withdrawn from the workpiece. The spring 15 is disposed in an aperture 16 in the center of the driving head 11 in which the blade body 12 is secured in fixed relation to the sleeve 13. The blade body 12 has a central slot 17 therein in which a blade 18 is pivoted on a pin 19 disposed between the end having the cutting head 21 and the sloping end 22 thereof. A spring 23 is secured in an aperture 24 in the inner end of the body 12 by a setscrew 25. The projecting end of the spring engages the inner edge of the sloping end of the blade to urge it outwardly and to thereby retract the head 21 within the slot when the driving head 11 is retracted relative to the blade body 12.

The sleeve 13 has an outer threaded surface on which a lower sleeve 26 and an upper sleeve 27 are threaded. An indicating ring 28 having indicia thereon is disposed between the sleeves 26 and 27. The ring is prevented from rotating by an inwardly projecting head 29 of a screw 31 which is threaded into the ring from the inner side thereof. The head 29 operates in a slot 32 in the sleeve 13 which is made from brass, bronze or other bearing material so that the head may readily slide within the slot and the body 11 within the sleeve. An indicium 30 is provided on the sleeve 26 so that the degree of adjustment will be apparent. The adjustment of the sleeves positions the bearing 34 relative to the cutting end 21 to regulate the point of cut of the blade relative to the workpiece 37.

The end of the lower sleeve 26 has a shoulder 33 therein extending inwardly from the bottom for receiving a ball bearing 34 which is press fitted therein. The outer race 35 of the bearing is disposed in a position to engage the top surface 36 of the workpiece 37. This retains the sleeve 13, pin 14, and blade body 12 in fixed position as the driving head body 11 continues to advance to compress the spring 15 and move the cam element 39 over the sloping end 22 of the blade 18 and move the cutting edge 21 outwardly of the blade body 12. The cam element 39 is cylindrical in shape with its center off center from the center of a cylindrical body 41 which is secured in a cylindrical aperture 40 by a setscrew 42. The cam element 39 has a hexagon recess 43 in its end in which a tool may be inserted for rotating the cylindrical body 41 to adjust the cam element 39 in the aperture 40 to thereby control the degree of advancement of the cutting end 21 from the slot 17.

When the head 11 is in retracted position, the spring 23 rocks the blade 18 clockwise to have the sloping end 22 move inwardly toward the bearing 34. This permits the cutting end 21 to be retracted within the slot 17 so that the body 12 may be advanced through an aperature of the workpiece 37. During the advancement the race 35 will engage the surface 36 of the workpiece and interrupt the advancement of the sleeve 13 and the body 12 along with the supporting pin 14, permitting the driving head 11 to continue to advance between the sleeve 13 and the body 12 over the pin 14. The edge of the sloping end 22 opposite to that engaged by the spring 23 is contacted by the cam element 39 and as the advancing movement continues, the sloping end 22 is deflected inwardly to force the cutting end 21 outwardly of the slot into cutting position which is that illustrated in FIG. 1.

What is claimed is:

1. A cutting tool having a driving head containing a central aperture, a blade receiving body within said aperture having a slot therein, a blade in said slot having a sloping cam at one end and a cutting projection on the the other end, a pivot between said ends passing through the slot in the blade body, a sleeve slidable on said body, a bearing supported on the forward end of said sleeve for engaging the work, a spring within said aperture engaging the inner end of said blade body, spring means within said aperture urging the sloping cam end of the blade outwardly of the slot for retracting the cutting projection within said slot, a pin extending through the sleeve and blade body and through a slot in the driving head to permit the driving head to advance relative to the blade body and sleeve, and a cam actuating element in the forward end of said driving head adjustable toward and from the head center in position to engage the sloping cam end of said blade for moving it inwardly and the cutting projection outwardly an amount conforming to the adjusted position of said element.

2. A cutting tool having a driving head containing a central aperture, a blade receiving body within said aperture having a slot therein, a blade in said slot having a sloping cam at one end and a cutting projection on the other end, a pivot between said ends passing through the slot in the blade body, a sleeve slidable on said body, a bearing supported on the forward end of said sleeve for engaging the work, a spring within said aperture engaging the inner end of said blade body, spring means within said aperture urging the sloping cam end of the blade outwardly of the slot for retracting the cutting projection within said slot, a pin extending through the sleeve and blade body and through a slot in the driving head to permit the driving head to advance relative to the blade body and sleeve, and a cam actuating element in the forward end of said driving head disposed in position to engage the sloping cam end of said blade for moving it inwardly and the cutting projection outwardly, said cam actuating element being an extension of a cylindrical member and being of smaller diameter with its center offset from the member to have its surface advanced or retracted relative to the sloping cam end of the blade by the rotational adjustment of the cylindrical member.

3. A cutting tool having a driving head containing a central aperture, a blade receiving body within said aperture having a slot therein, a blade in said slot having a sloping and a cutting end, a pivot between said ends passing through the slot in the blade body, a sleeve slidable on said body, a bearing supported on the forward end of said sleeve for engaging the work, a spring within said aperture engaging the inner end of said blade body, spring means within said aperture urging the sloping end of the blade outwardly of the slot for retracting the cutting end within said slot, a pin extending through the sleeve and blade body and through a slot in the driving head to permit the driving head to advance relative to the blade body and sleeve, and a cam element in the forward end of said driving head disposed in position to engage the sloping end of said blade for moving it inwardly and the cutting end outwardly, said cam element being an extension of a cylindrical member and being of smaller diameter with its center offset from the member to have its surface advanced or retracted relative to the sloping end of the blade by the rotational adjustment of the cylindrical member, said offset cylindrical member having an end recess for a tool by which adjustment may be made and said driving head having a setscrew therein for locking said cylindrical member in adjusted position.

4. A cutting tool having a driving head containing a central aperture, a blade receiving body within said aperture having a slot therein, a blade in said slot having a sloping cam on one end and a cutting projection on the other end, a pivot between said ends passing through the slot in the blade body, a sleeve on said body, a bearing for engaging the work, a spring within said aperture engaging the inner end of said blade body, spring means within said aperture urging the sloping cam end of the blade outwardly of the slot for retracting the cutting projection within said slot, a pin extending through the sleeve and blade body and through a slot in the driving head to permit the driving head to advance relative to the blade body and sleeve, said sleeve having a thread on its outer surface and containing a longitudinal slot therein, and an internally threaded sleeve on the lower portion of the externally threaded sleeve for supporting said bearing.

5. A cutting tool having a driving head containing a central aperture, a blade receiving body within said aperture having a slot therein, a blade in said slot having a sloping and a cutting end, a pivot between said ends passing through the slot in the blade body, a sleeve slidable on said body, a bearing supported on the forward end of said sleeve for engaging the work, a spring within said aperture engaging the inner end of said blade body, spring means within said aperture urging the sloping end of the blade outwardly of the slot for retracting the cutting end within said slot, a pin extending through the sleeve and blade body and through a slot in the driving head to permit the driving head to advance relative to the blade body and sleeve, said sleeve having a thread on its outer surface and containing a longitudinal slot therein, an internally threaded sleeve on the lower portion of the first said sleeve and supporting said bearing, and an internally threaded sleeve on the opposite end of said externally threaded sleeve for locking said internally threaded sleeves on the externally threaded sleeve.

6. A cutting tool having a driving head containing a central aperture, a blade receiving body within said aperture having a slot therein, a blade in said slot having a sloping and a cutting end, a pivot between said ends passing through the slot in the blade body, a sleeve slidable on said body, a bearing supported on the forward end of said sleeve for engaging the work, a spring within said aperture engaging the inner end of said blade body, spring means within said aperture urging the sloping end of the blade outwardly of the slot for retracting the cutting end within said slot, a pin extending through the sleeve and blade body and through a slot in the driving head to permit the driving head to advance relative to the blade body and sleeve, said sleeve having a thread on its outer surface and containing a longitudinal slot therein, an internally threaded sleeve on the lower portion of the first said sleeve and supporting said bearing, an internally threaded sleeve on the opposite end of said externally threaded sleeve for locking said internally threaded sleeves on the externally threaded sleeve, and a ring slidable on the externally threaded sleeve having an inward projection disposed within the longitudinal slot, said ring being clamped between said internally threaded sleeves.

7. A cutting tool having a driving head containing a central aperture, a blade receiving body within said aperture having a slot therein, a blade in said slot having a sloping and a cutting end, a pivot between said ends passing through the slot in the blade body, a sleeve slidable on said body, a bearing supported on the forward end of said sleeve for engaging the work, a spring within said aperture engaging the inner end of said blade body, spring means within said aperture urging the sloping end of the blade outwardly of the slot for retracting the cutting end within said slot, a pin extending through the sleeve and blade body and through a slot in the driving head to permit the driving head to advance relative to the blade body and sleeve, said sleeve having a thread on its outer surface and containing a longitudinal slot therein, an internally threaded sleeve on the lower portion of the first said sleeve and supporting said bearing, an internally threaded sleeve on the opposite end of said externally threaded sleeve for locking said internally threaded sleeves on the externally threaded sleeve, a ring slidable on the externally threaded sleeve having an inward projection disposed within the longitudinal slot, said ring being clamped between said internally threaded sleeves, and indicia on said ring and on one of said internally threaded sleeves by which the degree of rotation of the latter and the position of said bearing are indicated.

8. In a driving head for a cutting tool, a body having an external thread and a longitudinal slot which cuts through the threads, a ring having an internal projection mounted over the threads with the projection within the slot for preventing rotary motion while permitting longitudinal adjustment relative to the body, a pair of internally threaded members threaded upon the thread of the body on opposite sides of the ring for locking the ring on the body, and indicia on said ring and on at least one of said members by which the adjustment of the members on the sleeve is indicated.

References Cited in the file of this patent
UNITED STATES PATENTS

| | | |
|---|---|---|
| 2,359,859 | Jarvis | Oct. 10, 1944 |
| 3,021,733 | Cogsdill | Feb. 20, 1962 |